United States Patent
Robert et al.

(10) Patent No.: US 8,875,410 B2
(45) Date of Patent: Nov. 4, 2014

(54) MEASURING DEVICE FOR A TELESCOPIC HANDLING ARM

(75) Inventors: René-Luc Robert, Cande (FR); Olivier Caget, Mesanger (FR)

(73) Assignee: Manitou BF, Ancenis (FR)

(*) Notice: Subject to any disclaimer, the term of this patent is extended or adjusted under 35 U.S.C. 154(b) by 254 days.

(21) Appl. No.: 13/468,066

(22) Filed: May 10, 2012

(65) Prior Publication Data

US 2012/0285031 A1 Nov. 15, 2012

(30) Foreign Application Priority Data

May 10, 2011 (FR) ...................... 11 53985

(51) Int. Cl.
*B66F 9/075* (2006.01)
*B66F 9/065* (2006.01)
*B66F 11/04* (2006.01)
*B66F 17/00* (2006.01)
*G01D 5/347* (2006.01)
*F15B 15/28* (2006.01)

(52) U.S. Cl.
CPC .......... *B66F 9/0655* (2013.01); *G01D 5/34746* (2013.01); *B66F 9/0755* (2013.01); *B66F 11/046* (2013.01); *B66F 17/006* (2013.01); *F15B 15/2838* (2013.01)
USPC ............................................. 33/785; 33/706

(58) Field of Classification Search
CPC .......................... B66F 9/0755; G01D 5/34746
USPC .................................................... 33/785, 706
See application file for complete search history.

(56) References Cited

U.S. PATENT DOCUMENTS

| | | | | |
|---|---|---|---|---|
| 4,074,794 A | * | 2/1978 | Scholl | 187/394 |
| 5,011,358 A | * | 4/1991 | Andersen et al. | 414/273 |
| 5,749,696 A | * | 5/1998 | Johnson | 414/635 |
| 6,099,235 A | * | 8/2000 | Cain et al. | 414/694 |
| 7,266,904 B2 | * | 9/2007 | Hammerl et al. | 33/706 |
| 2009/0101447 A1 | * | 4/2009 | Durham et al. | 187/238 |

FOREIGN PATENT DOCUMENTS

| | | |
|---|---|---|
| DE | 42 20 333 A1 | 12/1993 |
| DE | 199 60 376 A1 | 6/2001 |
| DE | 10 2009 023168 A1 | 12/2010 |
| EP | 0 798 260 A2 | 10/1997 |
| EP | 1 728 759 A2 | 12/2006 |
| EP | 1 923 347 A1 | 5/2008 |

OTHER PUBLICATIONS

French Search Report, dated Dec. 15, 2011, from corresponding French application.

* cited by examiner

*Primary Examiner* — Christopher Fulton
(74) *Attorney, Agent, or Firm* — Young & Thompson

(57) ABSTRACT

A measuring device for a telescopic handling arm, in which the telescopic handling arm includes at least two elements (1, 2) that are mounted to slide relative to each other, includes measuring elements for measuring the extension of the telescopic arm. The device further includes calculation elements (4) for calculating the extension of the movable portion (2) of the telescopic arm using the hydraulic characteristics of a hydraulic telescoping actuator (3), and the device further includes adjuster elements for adjusting the calculated movements via a signal transmitted by at least one element (5, 6) for contactless identification of the position of the movable portion (2) of the telescopic arm.

6 Claims, 2 Drawing Sheets

MEASURING DEVICE FOR A TELESCOPIC HANDLING ARM

The invention relates to a measuring device for a telescopic handling arm.

The invention is particularly useful for indicating the telescoping length of a telescopic arm of an aerial lift for lifting personnel, or for indicating the telescoping length of a telescopic arm of a fork lift truck.

BACKGROUND OF THE INVENTION

Telescopic handling arms of known type generally include a plurality of elements of section that is substantially rectangular with rounded corners, which elements are mounted to slide relative to one another, with skids being interposed therebetween.

Generally, slidably-mounted telescopic elements are elements of smaller section that are retractable into stationary elements of greater section.

For aerial lifts for lifting personnel, measuring means are known for measuring their telescoping length, which measuring means measure the extension of the internal or telescopic element.

The measuring means are generally constituted by a system comprising a cable winder, and a rotary encoder that measures the total turning angle of the cable winder. The winder and the rotary encoder are generally secured to the stationary beam of largest size, while the distal end of the winder cable is secured to the movable portion, the movement of which is to be measured.

When the telescopic arm is extended, the extension thus causes the cable to wind out, which in turn causes the winder to turn. The turning of the winder is measured by the rotary encoder that emits a signal to a processing system so as to determine the looked-for length.

Those means for measuring by unwinding a length of cable present several drawbacks. Winding the cable onto the winder generally requires a winder of large diameter, and this constitutes a bulky part to be positioned on the side of the main beam. The cable outside the main beam is also in danger of being damaged or ruptured in operation, or as a result of an undesirable accident or incident.

Other known means consist in placing measuring devices inside the hydraulic telescoping actuator in order to measure the stroke of the actuator. Such devices are usually very costly and limited to actuator lengths that are relatively short.

SUMMARY OF THE INVENTION

An object of the invention is to remedy the drawbacks of the known prior art by proposing a novel measuring device for a telescopic handling arm, which device is compact and reliable.

Another object of the invention is to propose a novel measuring device that is ergonomic and economic, without any risk of suffering wear or damage over time.

The invention provides a measuring device for a telescopic handling arm, said telescopic handling arm comprising at least two elements that are mounted to slide relative to each other, said device comprising measuring means for measuring the extension of the telescopic arm, the device being characterized both by the fact that the device further comprises calculation means for calculating the extension of the movable portion of the telescopic arm using the hydraulic characteristics of a hydraulic telescoping actuator, and by the fact that the device further comprises adjuster means for adjusting the calculated movements by means of a signal transmitted by at least one means for contactless identification of the position of the movable portion of the telescopic arm.

According to other alternative characteristics of the invention:

- the calculation means for calculating the extension of the movable portion of the telescopic arm use a hydraulic flowrate and a duration of activation of the hydraulic telescoping actuator;
- the calculation means for calculating the extension of the movable portion of the telescopic arm use a speed-of-movement correction defined by the setpoint given by an operator;
- the movable portion of the telescopic arm is provided with a plurality of spaced-apart markers that are able to be identified as they pass in front of at least one contactless sensor that is secured to the stationary portion of the telescopic arm;
- the markers secured to the movable portion of the telescopic arm are magnetic markers;
- each contactless sensor secured to the stationary portion of the telescopic arm is a magnetic sensor having a position that is adjustable;
- each magnetic sensor of adjustable position is mounted on a support that enables its position to be adjusted.

BRIEF DESCRIPTION OF THE DRAWINGS

The invention can be better understood from the following description, given by way of non-limiting example, and with reference to the accompanying drawings, in which.

DETAILED DESCRIPTION OF THE PREFERRED EMBODIMENTS

With reference to FIGS. 1 to 4, identical or functionally equivalent elements are identified by identical reference numbers.

Figure 1:
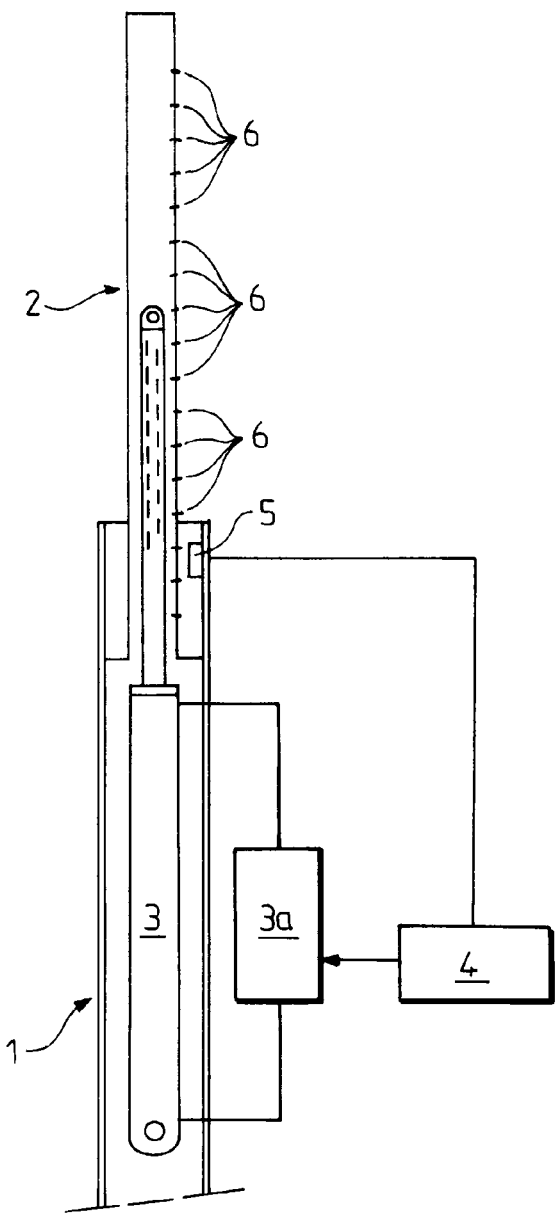
FIG. 1 is a diagram showing a device of the invention.

In FIG. 1, a telescopic arm includes a stationary element (1) for mounting on a chassis, e.g. a chassis of an aerial lift for lifting personnel. A movable element or portion (2) is mounted to slide in the stationary element or portion (1) under the action of a hydraulic actuator (3) of type known per se.

A control unit containing calculation means (4) controls a hydraulic system (3a) that acts on the hydraulic actuator (3) so as to drive telescoping of the movable portion (2) in sliding inside the stationary portion (1).

The movable portion (2) includes a plurality of markers (6) that are suitable for being detected by contactless detection by a sensor (5) that is secured to the stationary portion (1).

Naturally, the invention also extends to any other means for contactless identification of the position of the movable portion (2) of the telescopic arm relative to the stationary portion (1) of the telescopic arm.

The calculation means (4) for calculating the extension of the movable portion (2) of the telescopic arm preferably use a hydraulic flowrate that is produced by the hydraulic system (3a), the hydraulic flowrate acting on the hydraulic actuator (3) and moving it and the movable portion (2) that it actuates to move in a determined direction.

The calculation means (4) for calculating the extension of the movable portion (2) of the telescopic arm also use an indication relating to the duration for which the hydraulic telescoping actuator (3) is activated.

The calculation means (4) for calculating the extension of the movable portion (2) of the telescopic arm may also advantageously use a correction that is associated with the setpoint given by an operator of the machine for which the measuring device and the telescopic arm of the invention are intended.

Figure 2:
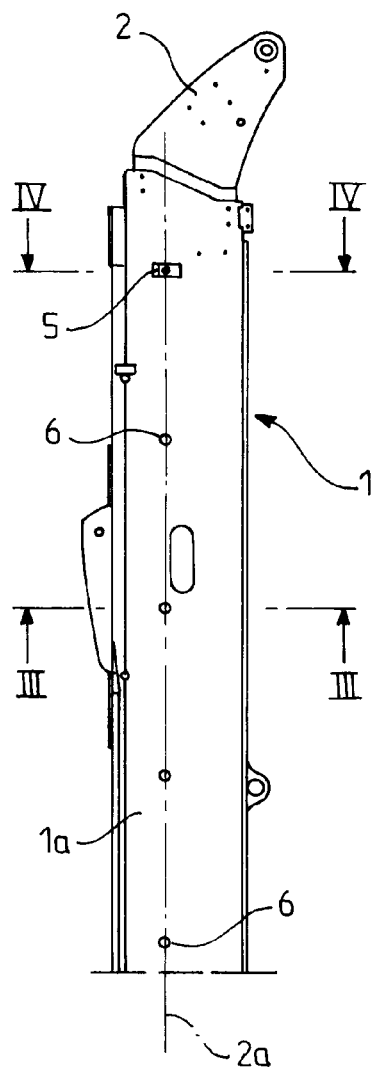
FIG. 2 is a diagram showing a fragmentary side view of a telescopic handling arm equipped to implement the invention.

In FIG. 2, the distal portion (1a) of the stationary portion (1) of the telescopic arm carries a magnetic sensor (5) that is mounted in adjustable manner facing a marker line (2a), along which there are implanted markers (6) that are suitable for being detected by the magnetic sensor (5).

Advantageously, the locations of the markers (6) are arranged at regular intervals, preferably at equidistant intervals.

The invention also extends to intervals that are not equidistant, but that are predefined by a predetermined spreading rule.

The markers (6) of the movable portion (2) that are suitable for being detected by the magnetic sensor (5) of the stationary portion (1) ensure that the calculation means (4) are reset, in particular in the event of a variation in the hydraulic characteristics of the machine, e.g. associated with wear or with an inaccuracy as a result of a loss of position identification during a reversal in the telescoping direction.

In this way, the calculation parameters that determine the speed of the movement and the duration of the movement from the hydraulic characteristics relating to the actuator (3) are updated as each marker (6) passes in front of the sensor (5) by comparing the theoretical movement of the movable portion (2) relative to the stationary portion (1) with the real position of the movable portion (2) given by the detection of a marker (6) by the sensor (5) on the stationary portion (1).

The invention thus makes it possible to verify continuously the functioning of the calculation means (4), and consequently to correct the result given by the evaluation program or the algorithm for calculating the position of the movable portion (2) from hydraulic characteristics relating to the telescoping actuator (3).

This continuous correlation thus makes it possible to avoid inaccuracies due for example to a small internal leak of hydraulic fluid, to dead volumes in the hydraulic circuit, or to any other hydraulic phenomenon that might falsify the calculation algorithm used for determining the position of the movable portion (2).

The periodic resetting by means of the markers (6) also makes it possible to indicate or to display anomalies in the operation of the hydraulic circuit when said circuit gives rise to calculations that present an error that is greater than some predetermined level of uncertainty.

In an advantageous variant of the invention, the measuring device includes three induction sensors (5) that make it possible to define the fully-retracted point of the movable portion (2), an intermediate point, and the fully-extended point of the movable portion (2). These three other induction sensors (5) make it possible, by counting, to verify that all of the magnetic markers (6) are present.

A fault is indicated if a magnetic marker (6) is missing, and the device is put into its safety position until the fault is put right by the operator.

By means of the invention, the extension of the movable portion (2) of a telescopic arm is measured in simple and rapid manner, without any risk of wear over time as a result of the absence of contact between the detected markers (6) and the detecting sensor (5).

Figure 3:
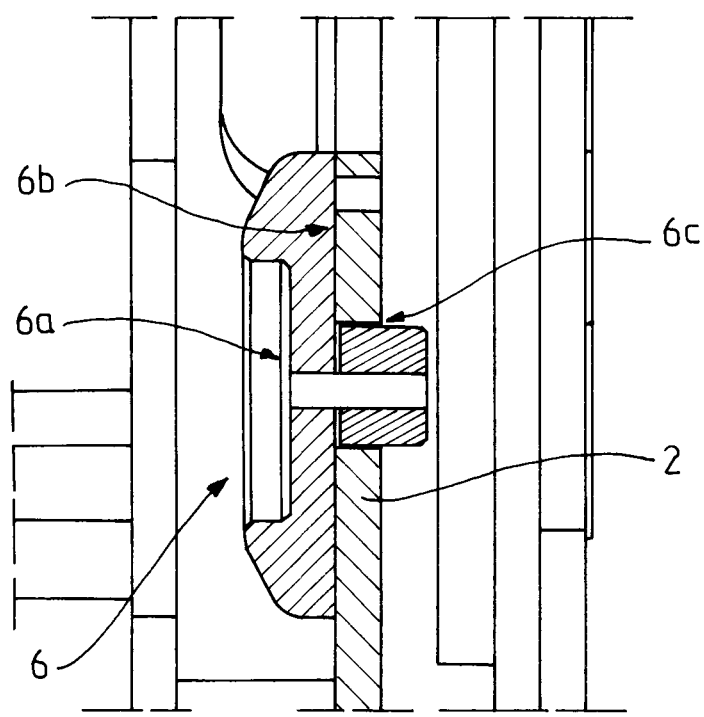
FIG. 3 is a diagrammatic fragmentary section view on line III-III of FIG. 2 of a telescopic arm equipped in accordance with the invention.

In FIG. 3, a magnetic marker (6) is made in the form of a tab (6a) that is mounted at a predefined location.

Each predefined location is machined, preferably by precision machining such as laser cutting, providing an insertion position in a side or a flank of the movable portion (2) of the telescopic arm.

The tab (6a) is mounted in a support (6b) that presents a cylindrical stud (6c) that is mounted in the bore formed by laser cutting in a flank of the tube of the movable portion (2).

The support (6b) is secured to the tube of the movable portion (2) by screw-fastening or by welding, or by any other equivalent mechanical bonding means.

The magnetic tab (6a) is mounted in its support (6b) in non-removable manner, e.g. by non-removable mounting in a cavity of the magnetic support (6b).

The detection area corresponding to the magnetic tab (6a) is preferably greater than 4 square centimeters ($cm^2$), so as to ensure that the marker (6) is detected under all operating conditions.

Figure 4:
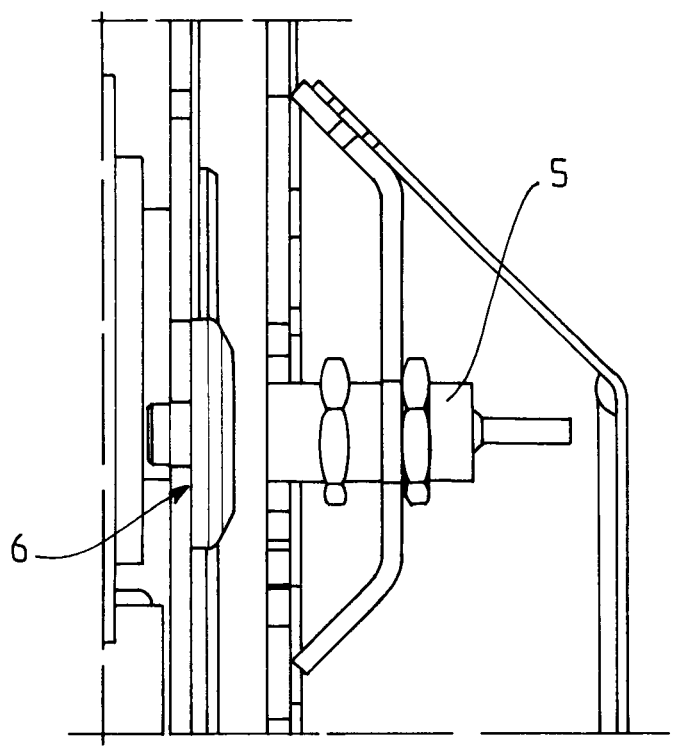
FIG. 4 is a diagrammatic fragmentary section view on line IV-IV of FIG. 2 of a telescopic arm equipped in accordance with the invention.

In FIG. 4, a magnetic-detection sensor (5) is shown in its position for detecting a magnetic tab (6a) that is secured to the movable portion (2).

The sensor (5) is fastened on a support (7) that is secured to the stationary portion (1), the sensor preferably being mounted on the support by screw-fastening in such a manner as to make it possible to adjust the end of the sensor (5) facing the magnetic tab (6a).

The adjustment of the distance between the end of the sensor (5) and the surface of the magnetic tab (6a) thus makes it possible to position and to center the end relative to the magnetic tab (6a), and to adjust their mutual spacings so as to guarantee effective detection under all operating conditions.

Preferably, the magnetic sensor (5) is a sensor that includes a nut and a position-adjusting lock-nut.

The presence of the nut and of the position-adjusting lock-nut also makes it possible to change the sensor in the event of a failure.

The invention described with reference to a particular embodiment is not limited thereto, but, on the contrary, covers any modification of shape, and any variant embodiment within the ambit and the spirit of the invention.

The invention claimed is:

1. A measuring device for a telescopic handling arm with at least two elements (1, 2) mounted to slide relative to each other, comprising:
   measuring means for measuring an extension of the telescopic arm;
   calculation means (4) for calculating an extension of a movable portion (2) of the telescopic handling arm using hydraulic characteristics of a hydraulic telescoping actuator (3); and
   adjuster means for adjusting calculations of the calculation means by means of a signal transmitted by at least one means for contactless identification of a position of the movable portion (2) of the telescopic handling arm,
   wherein the means for contactless identification comprises a plurality of spaced-apart markers (6), secured to the movable portion of the telescopic handling arm, that are able to be identified as they pass in front of at least one contactless sensor (5) that is secured to a stationary portion of the telescopic handling arm, and wherein the calculation means (4) use a hydraulic flowrate and a duration of activation of the hydraulic telescoping actuator (3).

2. A measuring device for a telescopic handling arm with at least two elements (1, 2) mounted to slide relative to each other, comprising:

measuring means for measuring an extension of the telescopic handling arm;

calculation means (4) for calculating an extension of a movable portion (2) of the telescopic handling arm using hydraulic characteristics of a hydraulic telescoping actuator (3); and adjuster means for adjusting calculations of the calculation means by means of a signal transmitted by at least one means for contactless identification of a position of the movable portion (2) of the telescopic handling arm, wherein the means for contactless identification comprises a plurality of spaced-apart markers (6), secured to the movable portion of the telescopic handling arm, that are able to be identified as they pass in front of at least one contactless sensor (5) that is secured to a stationary portion of the telescopic handling arm, and wherein the calculation means (4) applies a correction to a calculated speed-of-movement based on a setpoint provided by an operator.

3. A measuring device for a telescopic handling arm with at least two elements (1, 2) mounted to slide relative to each other, comprising:

measuring means for measuring an extension of the telescopic handling arm;

calculation means (4) for calculating an extension of a movable portion (2) of the telescopic handling arm using hydraulic characteristics of a hydraulic telescoping actuator (3); and adjuster means for adjusting calculations of the calculation means by means of a signal transmitted by at least one means for contactless identification of a position of the movable portion (2) of the telescopic handling arm, wherein the means for contactless identification comprises a plurality of spaced-apart markers (6), secured to the movable portion of the telescopic handling arm, that are able to be identified as they pass in front of at least one contactless sensor (5) that is secured to a stationary portion of the telescopic handling arm.

4. The measuring device for a telescopic handling arm according to claim 3, wherein the plurality of spaced-apart markers (6) are magnetic markers secured to the movable portion of the telescopic handling arm.

5. The measuring device for a telescopic handling arm according to claim 3, wherein each contactless sensor (5) secured to the stationary portion of the telescopic handling arm is a magnetic sensor having a position that is adjustable.

6. The measuring device for a telescopic handling arm according to claim 5, wherein each magnetic sensor is mounted on a support (7) that enables a position of a respective magnetic sensor to be adjusted.

\* \* \* \* \*